(12) United States Patent
Han et al.

(10) Patent No.: US 10,037,527 B2
(45) Date of Patent: Jul. 31, 2018

(54) END-TO END DEVICE AUTHENTICATION

(71) Applicant: NCR Corporation, Duluth, GA (US)

(72) Inventors: Richard Han, Scotland (GB); Charles Harrow, Scotland (GB); Andrew Monaghan, Scotland (GB)

(73) Assignee: NCR Corporation, Atlanta, GA (US)

( * ) Notice: Subject to any disclaimer, the term of this patent is extended or adjusted under 35 U.S.C. 154(b) by 584 days.

(21) Appl. No.: 14/193,967

(22) Filed: Feb. 28, 2014

(65) Prior Publication Data
US 2015/0248674 A1    Sep. 3, 2015

(51) Int. Cl.
| | |
|---|---|
| H04L 29/00 | (2006.01) |
| G06Q 20/38 | (2012.01) |
| G06Q 20/10 | (2012.01) |
| G07F 19/00 | (2006.01) |
| G06Q 20/18 | (2012.01) |
| G06Q 20/32 | (2012.01) |
| G06Q 20/34 | (2012.01) |
| G06Q 20/40 | (2012.01) |
| G07F 7/10 | (2006.01) |
| H04L 29/06 | (2006.01) |
| H04W 12/06 | (2009.01) |
| G06F 21/10 | (2013.01) |
| H04N 21/4627 | (2011.01) |
| G06F 21/44 | (2013.01) |
| G06F 21/62 | (2013.01) |
| G07F 7/00 | (2006.01) |

(52) U.S. Cl.
CPC ......... *G06Q 20/3829* (2013.01); *G06F 21/10* (2013.01); *G06F 21/445* (2013.01); *G06F 21/6209* (2013.01); *G06Q 20/10* (2013.01); *G06Q 20/1085* (2013.01); *G06Q 20/18* (2013.01); *G06Q 20/32* (2013.01); *G06Q 20/341* (2013.01); *G06Q 20/40* (2013.01); *G06Q 20/4014* (2013.01); *G07F 7/00* (2013.01); *G07F 7/1008* (2013.01); *G07F 19/20* (2013.01); *G07F 19/203* (2013.01); *G07F 19/211* (2013.01); *H04L 63/08* (2013.01); *H04N 21/4627* (2013.01); *H04W 12/06* (2013.01); *G06F 2221/2129* (2013.01)

(58) Field of Classification Search
CPC combination set(s) only.
See application file for complete search history.

(56) References Cited

U.S. PATENT DOCUMENTS 5,917,421 A * 6/1999 Saunders ............. G06Q 20/382
                                                                  235/375
7,159,114 B1    1/2007 Zajkowski et al.
7,309,004 B1   12/2007 Muschellack et al.
(Continued)

OTHER PUBLICATIONS

Menezes et al: In: "Handbook of Applied Cryptography", 1997, CRC Press LLC, USA, XP055210495, pp. 321-424, pp. 323,325 p. 352 p. 359-p. 367 p. 387-p. 390 p. 397-p. 400.

*Primary Examiner* — Ghazal Shehni
(74) *Attorney, Agent, or Firm* — Schwegman, Lundberg & Woessner

(57) ABSTRACT

End-to-end device authentication is provided. A dispenser receives an authorization token and a dispense amount from a host. The authorization token and the dispense amount are validated and when validation is successful, the dispenser dispenses the dispense amount.

19 Claims, 4 Drawing Sheets

(56) References Cited

U.S. PATENT DOCUMENTS

| | | | | |
|---|---|---|---|---|
| 2010/0145852 A1* | 6/2010 | Morson | ............. | G06Q 20/1085 |
| | | | | 705/43 |
| 2013/0159021 A1* | 6/2013 | Felsher | ................ | G06F 19/322 |
| | | | | 705/3 |
| 2013/0282588 A1* | 10/2013 | Hruska | ................. | G06Q 20/10 |
| | | | | 705/67 |

* cited by examiner

END-TO END DEVICE AUTHENTICATION

BACKGROUND

Increasingly consumers are conducting financial transactions through Self-Service Terminals (SSTs) without the assistance of a clerk. In fact, in many cases these transactions are conducted without any individual in the vicinity of the SSTs; other than, perhaps, a security camera integrated into the SSTs or in proximity to the SSTs.

The most common SST transaction occurs by a customer at an Automated Teller Machine (ATM). Contrary to what the general public believes, ATMs can be compromised and in some ways in a manner that takes advantage of inherent security holes of existing ATMs.

For example, in a typical ATM transaction a customer inserts a bank card into an encrypted Personal Identification Number (PIN) keypad. Software on the ATM receives that encrypted information, which the ATM software cannot decrypt and sends it to an appropriate backend financial system for authentication. The financial sends returns and authorization code to the ATM software and the customer selects and account and an amount to withdraw. This is then sent to the financial system for verification. Again, the financial system returns an authentication. Next, the ATM sends a dispense command to a dispenser and the dispenser dispenses the currency amount associated with the withdrawal.

In the above scenario, if the ATM software can be replaced or modified then the amount for withdraw sent to the dispenser can be changed or can be repeated multiple times; thereby depleting the ATM of all its currency. This is of particular concern to the owners and operators of the ATMs because the financial system tied to a transaction may only honor the initial authorized amount for withdrawal, leaving the ATM owner and operator with no recourse to recoup the stolen funds.

SUMMARY

In various embodiments, end-to-end device authentication is presented.

According to an embodiment, a token and a dispense command that are issued from a host are obtained. Then, the token and the dispense command are validated before the dispense command is permitted to process.

DETAILED DESCRIPTION

Figure 1:
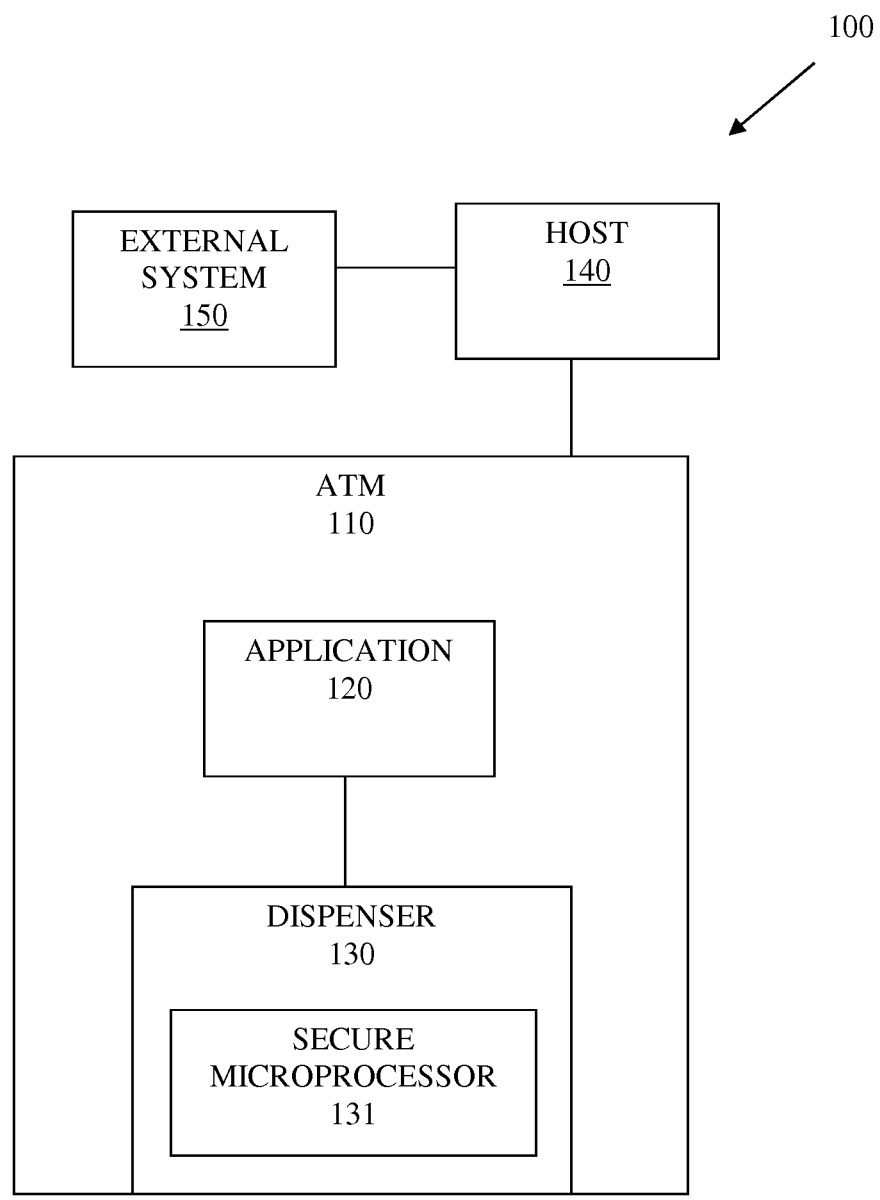
FIG. 1 is a diagram for practicing end-to-end device authentication using an Automated Teller Machine (ATM), according to an example embodiment.

FIG. 1 is a diagram 100 for practicing end-to-end device authentication using an Automated Teller Machine (ATM) 110, according to an example embodiment. The various components are illustrated and the arrangement of the components is presented for purposes of illustration only. It is to be noted that other arrangements with more or less components are possible without departing from the onsite automated customer assistance teachings presented herein and below.

The ATM, techniques, methods, and Self-Service Terminal (SST) presented herein and below for end-to-end device authentication can be implemented in whole or in part in one, all, or some combination of the components shown with ATM 110. The techniques and methods are programmed as executable instructions in memory and/or non-transitory computer-readable storage media and processed on one or more processors associated with the various components.

The discussion of the diagram 100 is within the context of transaction at an ATM 110. It is noted that the diagram 100 is also applicable to any enterprise providing Self-Service Terminals (SSTs). Thus, the description that follows below is but one embodiment of the invention and it not intended to limit the invention to only financial transactions on the ATM 110.

The example diagram 100 includes an ATM 110, a host 140, and an external financial system 150. The ATM 110 includes an application 120 and a dispenser 130. The dispenser 130 includes a secure microprocessor 131.

The ATM 110 is presented in greatly simplified form and is used to illustrate only those portions of components modified for purposes of achieving end-to-end device authentication from the dispenser 130 to the host 140, or, optionally, the external financial system 150.

The application 120 includes an Application Programming Interface (API) for interacting with the dispenser 130 and the host 140. The application 120 also includes a forward-facing Graphical User Interface (GUI and not shown in the FIG. 1) for interaction with a customer to perform a financial transaction with the external financial system 150.

The dispenser 130 is coupled to or integrated within the AMT 110 as an independent device. The coupling can be via a Universal Serial Bus (USB) port interface or other port interface. The dispenser 130 includes a dispensing mechanism for dispensing currency to a customer. The dispensing mechanism is capable of counting the currency from available denominations and activating a door for dispensing the counted currency. The dispenser 130 is only accessible for interaction through the application 120 API.

The dispenser 130 also includes a secure microprocessor 131, which is not accessible to any of the API calls made by the application 120. The secure microprocessor 131 houses cryptographic keys, certificates, and one or more cryptographic algorithms (functions). In some cases, the secure microprocessor 131 is pre-manufactured with the keys, certificates, and functions. In other cases, the keys, certificates, and functions can be installed on the secure microprocessor 131 by removing the dispenser 130 from the ATM 110 and interfacing the dispenser 130 to an independent secure device for installation and initial configuration.

The interaction of the components is now discussed with an example configuration and operational scenario. It is noted that other scenarios are possible without departing from the beneficial teachings provided herein.

Initially, the secure microprocessor 131 includes a root certificate (acting as its own certificate authority) that it can use to validate certificates issued from the certificate authority. The dispenser 130 (through the secure microprocessor 131) and the host 140 exchange certificates through the application 120 of the ATM 110. It is noted, that the original certificate of the host 140 can be acquired via an out-of-band process from the certificate authority (perhaps manufacturer of the dispenser 130). The certificate from the host 140 includes the host's public key and the certificate of the dispenser 130 includes the dispenser's public key. This exchanging of certificates is done once.

Next, the host 140 is configured to supply a shared key between the host 140 and the dispenser 130. The host 140 encrypts the shared key with the public key of the dispenser 130 (acquired from the dispenser's exchanged certificate) and then signs the encrypted shared key with the host's private key. As used here, a "private key" is never exposed on a network wire and remains under the exclusive secure control of the owner of that private key.

The host 140 sends the encrypted shared key to the dispenser 130 through the application 120. The application 120 cannot decrypt the encrypted shared key without the private key of the dispenser 130 and the public key of the host 140; but, the private key of the dispenser 130 is locked securely in the secure microprocessor 131. The application 120 forwards the encrypted shared key to the dispenser 130.

The dispenser 130 provides the secure microprocessor 131 the encrypted shared key where it is decrypted and the signature of the host 140 validated, the decrypted shared key is then locked in the secure microprocessor.

The frequency of the exchange of the shared key between the host 140 and the dispenser 130 can be configured based on policy conditions. The frequency can range from one time only during initial configuration of the host 140 and the dispenser 130 or from each time a dispense command is sent to the dispenser 130 (transaction based).

It is also noted, that in some embodiments, the host 140 acts as a pass through (similar to the ATM application 120) such that the exchange of certificates (having the public keys and signed by the certificate authority) is between the dispenser 130 and the external financial system 150.

Once configuration is done, the ATM 110 is ready to provide secure end-to-end device authentication between an approving entity (host 140 or financial system 150) through to the dispenser 130. An example situation now follows for illustration.

A customer approaches the ATM 110 to withdraw some cash (currency or money). The GUI portion of the application 120 is activated for the customer to insert his/her bank card.

The customer indicates an account to withdraw from and an amount (dispense amount). The encrypted customer PIN, account being withdrawn from, and identity of the external financial system 150 are held by the application 120 (held so the host 140 is only contacted once over the network by the application 120) and the following enhanced processing occurs, which is different and improved over conventional processing.

The application 120 sends the dispense amount (command with the amount or just the amount where the dispense command is implied by the amount) to the dispenser 130. The secure microprocessor 131 is sent the dispense amount and acquires a nonce. The dispense amount with the nonce or just the nonce is sent back from the dispenser 130 to the application 120. The dispenser 130 controls the generation of the nonce in the secure microprocessor 131 and it is transaction based (for each dispense command), such that a same transaction will have a different nonce; thus, a rogue application on the ATM 110 cannot replay a transaction because the nonce will change.

The application 120 sends the dispense amount and the nonce to the host 140 (along with the previous acquired encrypted PIN, account being withdrawn from, and an identifier for the appropriate external financial system 150, such that the host 140 is pinged or contacted once by the application 120 over the network). In an embodiment, the description that follows for operations of the host 140 can be performed by the external financial system 150 with the host 140 acting as a pass through as the application 120 does with the dispenser 130. The host 140 uses the shared key, the nonce, and the dispense amount as input to a Method Authentication Code (MAC) function. The output of the MAC function is a short truncated string of any value (truncated string is referred to as a MAC message). The dispense amount and the MAC message are then sent from the host 140 to the application 120. The application 120 forwards the dispense amount and the MAC message to the dispenser. The dispenser 130 forwards the dispense amount and the MAC message to the secure microprocessor 131.

The secure microprocessor 131 passes the dispense amount, the shared key, and the nonce (that it generated for the dispense command (this transaction)) to a MAC function processing on the secure microprocessor 131. The MAC message generated by the secure microprocessor's MAC function is then compared with the MAC message received from the host 140 (through the application 120). If the dispenser's MAC message matches the host's supplied MAC message, then the dispenser 131 activates its dispensing mechanism to dispense the dispense amount. If the two MAC messages do not match, then the dispense command received from the application 120 is not processed; and, optionally, the dispenser 130 can send an error message back to the application 120 indicating the dispense amount is not authorized.

One now appreciates as authentication can be achieved by end devices that occurs through one (the ATM 110) or more (the host 140 when the external financial system 150 is used (as discussed above)) devices to another end device (the host 140 or the external financial system 150). This ensures verification during financial transactions, which has not been achievable to date in the financial industry.

It is noted that other arrangements and cryptology techniques can be used as well without departing from the teachings presented herein.

These (above-discussed) embodiments and other embodiments are now discussed with reference to the FIGS. 2-4.

Figure 2:
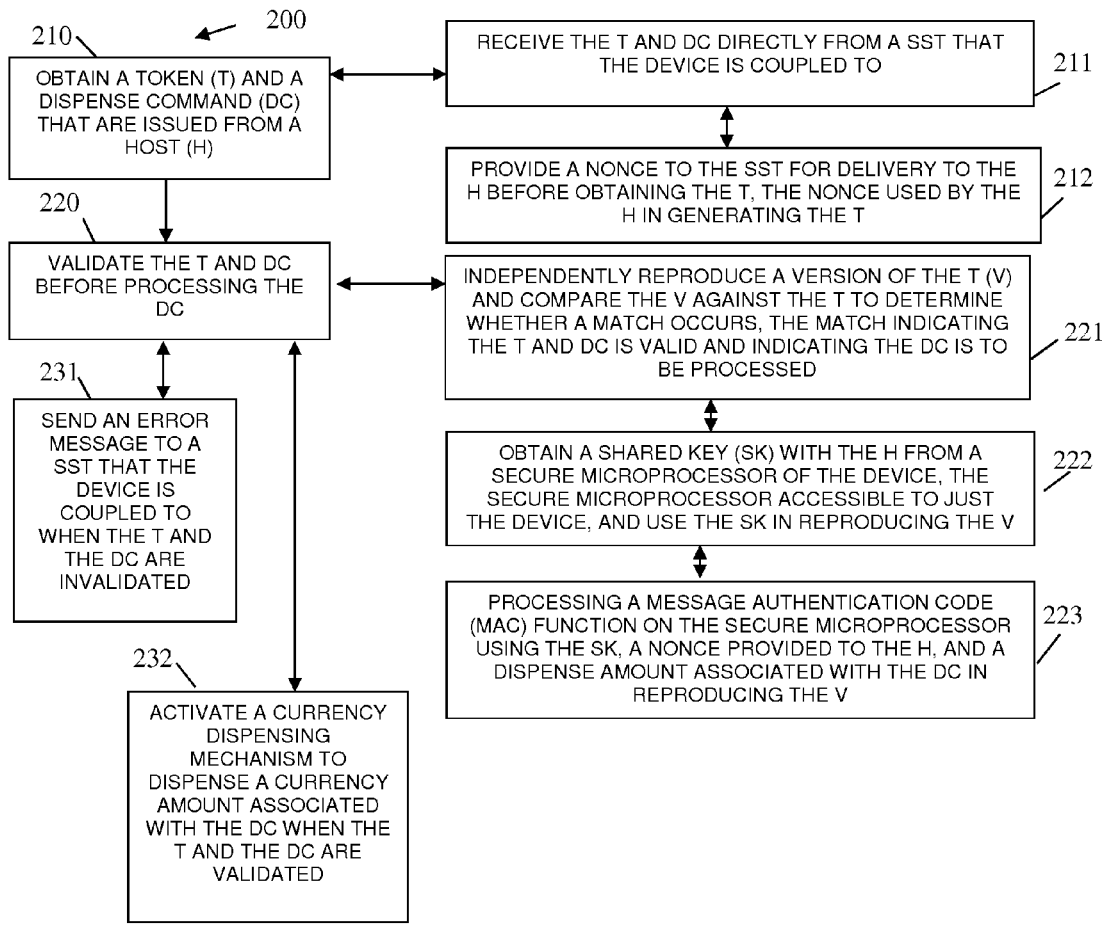
FIG. 2 is a diagram of a method for end-to-end device authentication, according to an example embodiment.

FIG. 2 is a diagram of a method 200 for end-to-end device authentication, according to an example embodiment. The software module(s) that implements the method 200 is referred to as a "dispenser validator." The dispenser validator is implemented as executable instructions programmed and residing within memory and/or a non-transitory computer-readable (processor-readable) storage medium and executed by one or more processors of a device. The processor(s) of the device that executes the dispenser validator are specifically configured and programmed to process the dispenser validator. The dispenser validator has access to one or more networks during its processing. The networks can be wired, wireless, or a combination of wired and wireless.

In an embodiment, the device(s) that processes the dispenser 130 coupled to the ATM 110 of the FIG. 1.

In another embodiment, the device that processes the dispenser validator is an integrated dispensing device associated with a kiosk. The integrated dispensing device can be coupled to the kiosk via a card slot, a Universal Serial Bus (USB) port, an Ethernet port, or other slot/port of the kiosk.

The perspective of the processing for the dispenser validator can be considered as being processing actions taken from an integrated or coupled device to an SST. The SST having a network connection to a host device, such as a server.

At 210, the dispenser validator obtains a token and a dispense command that are issued from a host. In an embodiment the host is the host 140 of the FIG. 1. In another embodiment, the host 140 performs a pass through of interactions to an external financial system 150 that performs the operations described herein for the host.

According to an embodiment, at 211, the dispenser validator receives the token and a dispense command (having a dispense amount or implied by the presence of a dispense amount) directly from a SST that the device that processes the dispenser validator is coupled to. (hereinafter, the device that processes the dispenser validator is referred to as a "dispenser".)

In an embodiment of 211 and at 212, the dispenser validator provides a nonce to the SST for delivery to the host before the token is provided by the host. The host uses the nonce with the dispense amount (or dispense command as discussed above) when producing or obtaining the token.

At 220, the dispenser validator validates the token and the dispense command before processing the dispense command.

In an embodiment of 220 and 212 at 221, the dispenser validator independently reproduces a version of the token and compares that version against the token to determine whether a match occurs. A successful match indicates the token and the dispense command are valid and indicates that the dispense command is to be processed by the dispenser validator to dispense the dispense amount associated with the dispense command.

In an embodiment of 221 and at 222, the dispenser validator obtains a shared key that is shared with the host from a secure microprocessor of the dispenser. The secure microprocessor is just accessible to the dispenser and not to the SST or any application processing on the SST. The dispenser validator uses the shared key in reproducing its own independent version of the host-supplied token.

In an embodiment of 222 and at 223, the dispenser validator processes a MAC function on the secure microprocessor using the shared key, the nonce provided by the dispenser validator to the host for the dispense command, and a dispense amount associated with the dispense command to reproduce the independent version of the MAC message.

According to an embodiment, at 231, the dispenser validator sends an error message to the SST (which the dispenser is coupled to) when the token and the dispense command were determined to be invalid or were invalidated by the dispenser validator.

In an embodiment, at 232, the dispenser validator activates a currency dispensing mechanism to dispense a currency amount associated with the dispense command when the token and the dispense command are validated.

It is noted that the dispenser validator can also authenticate the token by decrypting the token and/or verifying a signature of the host (external system) to perform validation; rather than, producing an independent version of the token as discussed above. Moreover, different cryptology approaches and cryptographic keys can be used for the secure cryptology encryption, decryption, and validation.

Also, the actual currency dispensed by the dispensing mechanism of the dispenser validator does not have to be currency in the form of bills. That is, in some embodiments, the dispensing mechanism provides a code written to electronic media and that code can be associated with a rebate, a discount, redemption of some good or service, gaming chips, gaming currency ticket, a virtual currency, perhaps, transmitted to a digital wallet, and the like.

The dispenser validator provides end-to-end device authentication (one end device being the dispenser and the other end device being the host (or external system when the host is acting as pass through)).

Figure 3:
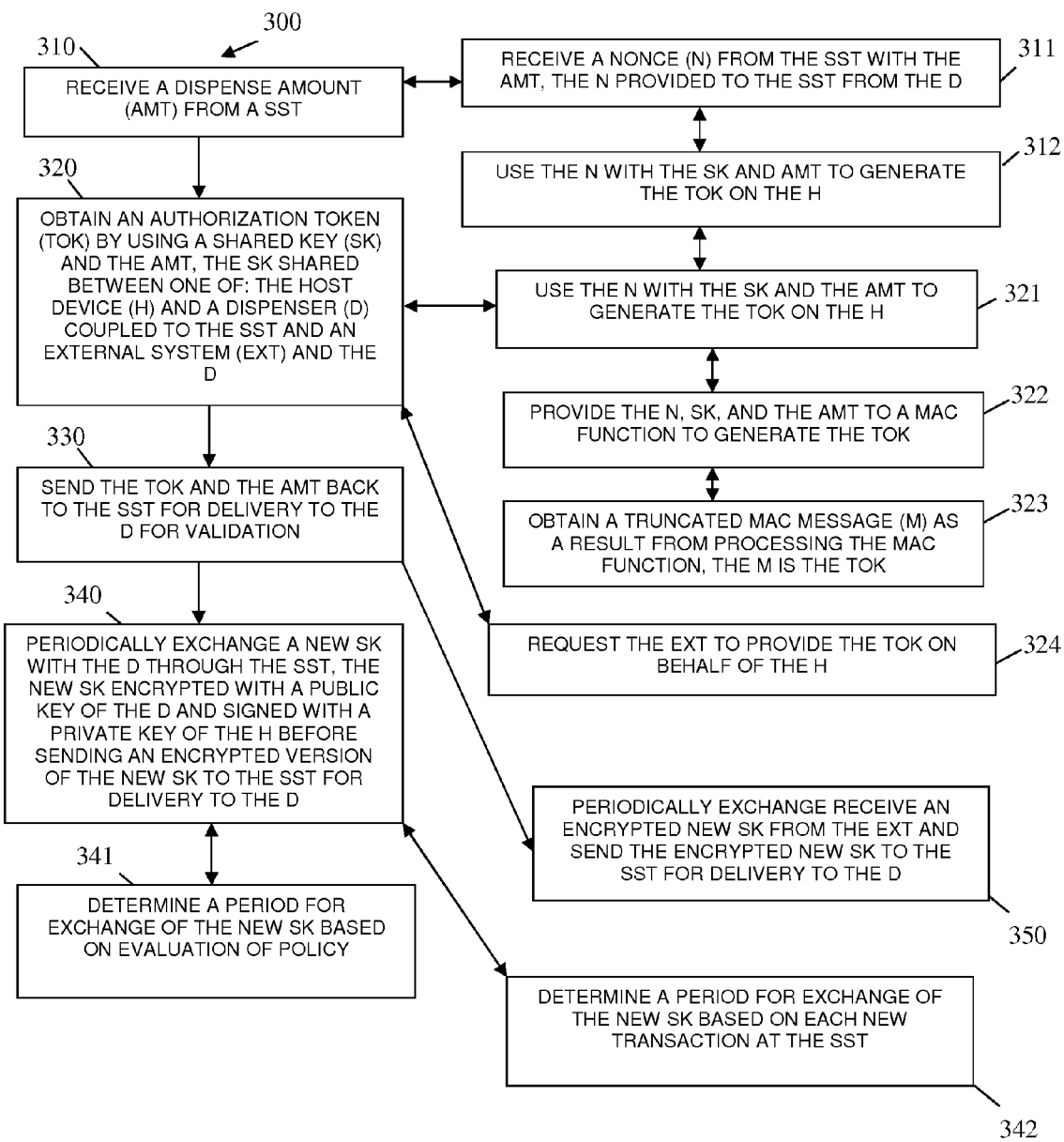
FIG. 3 is a diagram of another method for end-to-end device authentication, according to an example embodiment.

FIG. 3 is a diagram of another method 300 for end-to-end device authentication, according to an example embodiment. The software module(s) that implement the method 300 is referred to herein as a host validator. The host validator is implemented as executable instructions and programmed within memory and/or a non-transitory computer-readable (processor-readable) storage medium that executes on one or more processors of a server. The processors of the server are specifically configured to execute the host validator. The host validator can access one or more networks; the networks can be wired, wireless, or a combination of wired and wireless.

In an embodiment, the server that processes the host validator is host 140 of the FIG. 1.

At 310, the host validator receives a dispense amount from a SST. A dispenser responsible for processing the dispense amount within the SST and the host validator responsible for providing authentication of the dispense amount.

According to an embodiment, at 311, the host validator receives a nonce from the SST with the dispense amount. The nonce generated by the dispenser and provided to the SST for the dispense amount and a transaction occurring on the SST with a customer.

In an embodiment of 311 and at 312, the host validator uses the nonce with a shared key (shared between the host validator and the dispenser) along with the dispense amount to generate an authorization token.

At 320, the host validator obtains the authorization token by using a shared key and the dispense amount. Again, the shared key is shared between one of: the host and the dispenser or an external system and the dispenser.

In an embodiment of 320 and 313 at 321, the host validator uses the nonce with the shared key and the dispense amount to generate the token on the host.

In an embodiment of 321 and at 322, the host validator provides the nonce, the shared key, and the dispense amount to a MAC function to generate the authorization token.

In an embodiment of 322 and at 323, the host validator obtains a truncated MAC message as a result from processing the MAC function. The truncated MAC message is the authorization token.

According to an embodiment, at 324, the host validator requests the external system to provide the authorization token on behalf of the host.

At 330, the host validator sends the authorization token and the dispense amount back to the SST for delivery to the dispenser and for independent validation by the dispenser (end-to-end device authentication, one end device the host (or external system as discussed) and the other end device the dispenser).

In an embodiment, at 340, the host validator periodically exchanges a new shared key with the dispenser through the SST. The new shared key is encrypted with a public key of the dispenser and signed with a private key of the host before sending an encrypted version of the new shared key to the SST for delivery to the dispenser.

According to an embodiment of 340 and at 341, the host validator determines a period for exchange of the new shared key based on evaluation of a policy condition(s).

In an embodiment of 340 and at 342, the host validator determines a period for exchange of the new shared key based on each new transaction occurring at the SST with a customer.

In an embodiment, at 350, the host validator periodically receives an encrypted new shared key from the external system and sends the encrypted new shared key to the SST for delivery to the dispenser.

Figure 4:
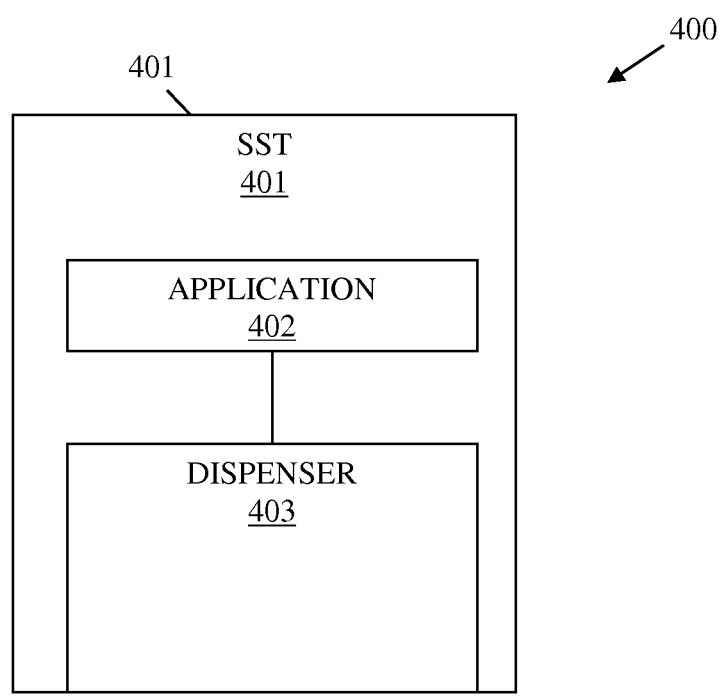
FIG. 4 is a diagram of an end-to-end device authentication Self-Service Terminal (SST), according to an example embodiment.

FIG. 4 is a diagram 400 of an end-to-end device authentication SST 401, according to an example embodiment. The components of the end-to-end device authentication SST 401 (herein after "SST 401") are programmed and reside within memory and/or a non-transitory computer-readable medium and execute on one or more processors of the SST 401. The SST 401 has access and can communicate over one or more networks; and the networks can be wired, wireless, or a combination of wired and wireless.

The SST 401 includes an application 402 and a dispenser 403.

The SST 401 coupled to the dispenser 403 and programmed with the application 402.

In an embodiment, the SST 401 is the ATM 110 of the FIG. 1.

In an embodiment, the SST 401 is a kiosk.

The application 402 is programmed within memory and/or non-transitory computer-readable storage media on the SST 401.

The application 402 is operable to execute on the SST 401 and interact with the dispenser 403 and a remote host.

The dispenser 403 includes a mechanism for dispensing an item. In an embodiment, the item is currency. In an embodiment, the item is an electronic code(s) representing currency (of virtual currency, Bitcoin, Litecoin, etc.) and the dispensing mechanism to electronic media, such as a Secure Digital (SD) card, a Universal Serial Bus (USB) device, etc. In an embodiment, the item is a non-currency item representing a physical good(s) associated with the SST 401.

The dispenser 403 includes a secure microprocessor for housing cryptographic keys and processing cryptographic functions. The secure microprocessor is not accessible to the SST 401 and is not accessible to the application 402.

In an embodiment, the dispenser 403 is the dispenser 130 of the FIG. 1.

In an embodiment, the dispenser 403 is the dispenser validator of the FIG. 2.

The dispenser 403 is operable to receive from the application 402 a dispense command including a dispense amount and receive an authorization token from the application 402, which was issued from a host device (externally located from the SST 401). The dispense command having the dispense amount and the authorization token directly provided by the application 402 but indirectly provided and issued from the host device.

The dispenser 403 is also operable to validate the authorization token and dispense the dispense amount when the authorization token is validated. The application 402 and the SST 401 do not participate in the validation other than forwarding the dispense command and the authorization token received from the host device. Moreover, the application 402 is unable to validate the authorization token.

In an embodiment, the dispenser 403 is further operable to periodically exchange an encrypted shared key with the host device through the application 402. The application is unable to decrypt the encrypted shared key. A decrypted version of the encrypted shared key used by the host device to produce the authorization token, and a decrypted version of the encrypted shared key used by the dispenser to validate the authorization token.

In an embodiment, the encryption and decryption used by the dispenser 403 and the host device are achieved through asymmetric keys, such that the shared key is encrypted by the host device with a public key of the dispenser 403 and digitally signed with a private key of the host device; and the shared key is decrypted by the dispenser 403 using a private key of the dispenser 403 and a public key of the host device. The private keys never leave and are never transmitted from the host device or the dispenser 403 and not access is provided to the private keys from those devices. The host device only knows the public key of the dispenser 403 via a certificate (initially configured with the certificate) and the host device has no access to and is unaware of the dispenser's private key. Similarly, the dispenser 403 only knows the public key of the host device via a root certificate housed or manufactured on the dispenser 403 and the dispenser 403 has no access to and is unaware of the host device's private key. In this manner, the SST 401 and the application 402 of the SST 401 are unable to discover the encrypted shared key that is shared between the dispenser 403 and the host device.

One now appreciates how dispensing operations of SSTs can be securely achieved in a manner that if the SSTs were to be compromised, the dispense operation can invalidated independent of the compromised SST.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining, by a secure microprocessor of a currency dispenser, a token and a dispense command that are issued from a host, wherein obtaining further includes receiving the token and the dispense command directly from a Self-Service Terminal (SST) that the currency dispenser device is coupled to, and wherein obtaining further includes receiving the token from an application processing on the SST with the application in network communication with the host; and validating, by the secure microprocessor, the token and the dispense command before processing the dispense command.

2. The method of claim 1, wherein receiving further includes providing a nonce to the SST for delivery to the host before obtaining the token, the nonce used by the host in generating the token.

3. The method of claim 1, wherein validating further includes independently reproducing a version of the token and comparing the version against the token to determine whether a match occurs, the match indicating the token and the dispense command are valid and indicating the dispense command is to be processed.

4. The method of claim 3, wherein independently reproducing further includes obtaining a shared key with the host from the secure microprocessor of the currency dispenser, the secure microprocessor accessible to just the currency dispenser, and using the shared key in reproducing the version.

5. The method of claim 4, wherein independently reproducing further includes processing a message authentication code function on the secure microprocessor using the shared key, a nonce provided to the host, and a dispense amount associated with the dispense command in reproducing the version.

6. The method of claim 1, wherein validating further includes sending an error message to a Self-Service Terminal (SST) that the currency dispenser is coupled to when the token and the dispense command are invalidated.

7. The method of claim 1, wherein validating further includes activating a currency dispensing mechanism to dispense a currency amount associated with the dispense command when the token and the dispense command are validated.

8. A method, comprising:

receiving, by a host device, a dispense amount from a Self-Service Terminal (SST), wherein receiving further includes receiving the dispense amount from an application processing on the SST with the application in communication with a secure microprocessor of a currency dispenser integrated into the SST as an independent device from the SST and the dispense amount originating from the currency dispenser;

obtaining, by the host device, an authorization token by using a shared key and the dispense amount, the shared key shared between one of: the host device and the currency dispenser coupled to the SST and an external system and the currency dispenser; and sending, by the host device, the authorization token and the dispense amount back to the application of the SST for delivery to the secure microprocessor of the currency dispenser for validation.

9. The method of claim 8, receiving further includes receiving a nonce from the SST with the dispense amount, the nonce provided to the SST from the secure microprocessor of the currency dispenser.

10. The method of claim 9, wherein obtaining further includes using the nonce with the shared key and the dispense amount to generate the authorization token on the host device.

11. The method of claim 10, wherein using further includes providing the nonce, the shared key, and the dispense amount to a Method Authentication Code (MAC) function to generate the authorization token.

12. The method of claim 11, wherein providing further includes obtaining a truncated MAC message as a result from processing the MAC function, the truncated MAC message is the authorization token.

13. The method of claim 8, wherein in obtaining further includes requesting the external system to provide the authorization token on behalf of the host device.

14. The method of claim 8 further comprising, periodically exchanging, by the host device, a new shared key with the secure microprocessor of the currency dispenser through the SST, wherein the new shared key is encrypted with a public key of the currency dispenser and signed with a private key of the host device before sending an encrypted version of the new shared key to the SST for delivery to the secure microprocessor of the currency dispenser.

15. The method of claim 14, wherein periodically exchanging further includes determining a period for exchange of the new shared key based on evaluation of a policy.

16. The method of claim 14, wherein periodically exchanging further includes determining a period for exchange of the new shared key based on each new transaction at the SST.

17. The method of claim 8 further comprising, periodically receiving an encrypted new shared key from the external system and sending the encrypted new shared key to the SST for delivery to the secure microprocessor of the currency dispenser.

18. A Self-Service Terminal (SST), comprising:

an application operable to: (i) execute on the SST, (ii) interact with a secure microprocessor integrated into a currency dispenser, and (iii) interact with a remote host; and the secure microprocessor of the currency dispenser operable to (i) couple to the SST, (ii) receiving from the application a dispense command including a dispense amount that is received by the application from the remote host, (ii) receive an authorization token from the application as issued by the remote host device, (iii) validate the authorization token independent of the application, and (iv) dispense the dispense amount when the authorization token is validated, wherein the currency dispenser is integrated into the SST.

19. The SST of claim 18, wherein the secure microprocessor of the currency dispenser is further operable to (v) periodically exchange an encrypted shared key with the remote host device though the application, wherein the application is unable to decrypt the encrypted shared key, and a decrypted version of the encrypted shared key used by the host device to produce the authorization token, and a decrypted version of the encrypted shared key used by the secure microprocessor of the currency dispenser to validate the authorization token.

* * * * *